Figure 2:
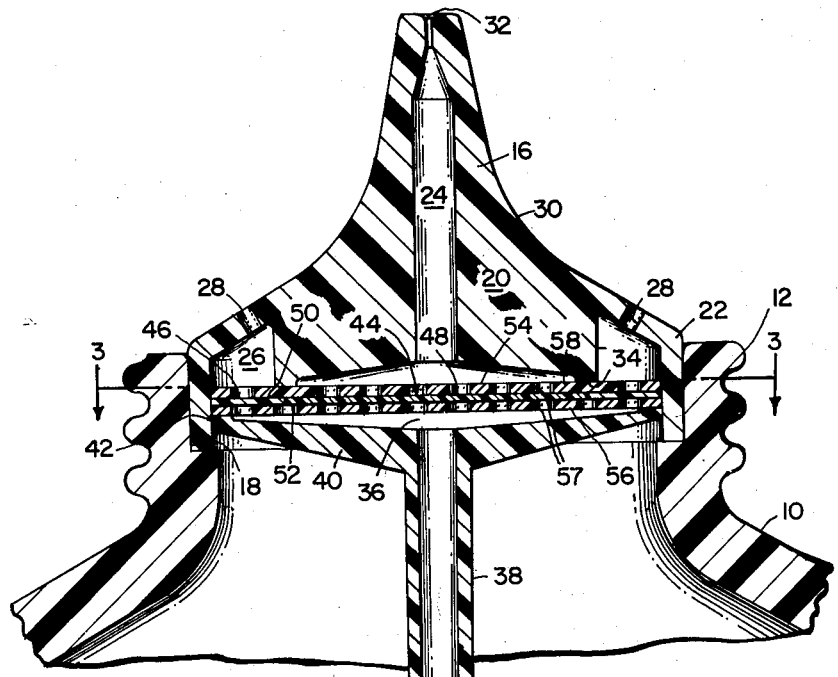
Figure 1:
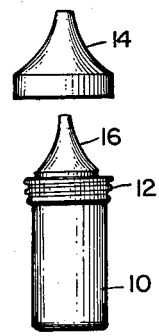
Figure 3:
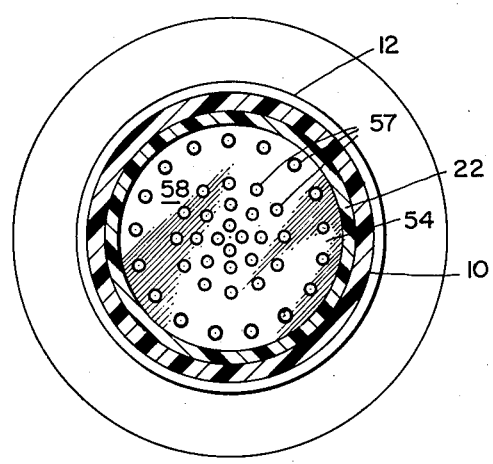

Sept. 22, 1964  J. H. BUSH ETAL  3,149,758
COMBINATION FILTER AND FLOW DIVIDER FOR GAS AND LIQUID
Filed Nov. 1, 1961

JOHN H. BUSH
DAVID B. PORTER
CHARLES W. FIFIELD
JAMES L. DWYER
*INVENTORS*

BY *Kenway, Jenney & Hildreth*

ATTORNEYS

United States Patent Office 3,149,758
Patented Sept. 22, 1964

3,149,758
COMBINATION FILTER AND FLOW DIVIDER
FOR GAS AND LIQUID
John H. Bush, Needham, Mass., Charles W. Fifield, Brookline, N.H., and James L. Dwyer, South Lincoln, and David B. Porter, Watertown, Mass., assignors to Millipore Filter Corporation, Bedford, Mass., a corporation of Massachusetts
Filed Nov. 1, 1961, Ser. No. 149,440
13 Claims. (Cl. 222—189)

This invention relates to a novel combination filter and flow divider for gas and liquid. The invention, in one aspect thereof, finds particular utility in liquid dispensers of the collapsible chamber or "squeeze bottle" type, and affords means for preventing the ingress of foreign matter and micro-organisms into the liquid contents of the dispenser in the course of normal use.

In the use of dispensing apparatus such as nasal sprays and the like, a spray nozzle of the dispenser repeatedly comes into intimate contact with viruses and bacteria, which enter the dispenser nozzle in an air stream drawn into the nozzle when the user releases the container for resilient spring-back to its original expanded form. Such micro-organisms present in the medicine render further use undesirable, and may actually lead to the propagation and spread of disease.

The present invention contemplates that a film of microporous filter material be provided to remove micro-organisms from a flow of air entering a liquid dispenser of the aforementioned type, and to prevent the ingress of micro-organisms through a liquid outlet passage. Microporous filter materials effective for removing micro-organisms are now commercially available in sheet form, having an effective pore size of only a fraction of a micron, and a sufficient number of pores to permit filtration with the rates of flow required in such dispensers. Such microporous filter films are described by Zsigmondy in U.S. Patent No. 1,421,341, by Grabar, P., and J. A. DeLoureiro in Annales de l'Institute Pasteur, 65, 159–189 (1939); by Lovell and Bush in U.S. Patent No. 2,783,894; and by Cotton in U.S. Patent No. 2,944,017. However, because of the very minute pore sizes of such filters, essential to effective filtration of micro-organisms and micron-size particles, the film when wet by the dispensed liquid is incapable of passing air sufficiently freely for use in a collapsible-chamber dispenser or other apparatus requiring flow of gas into a liquid container.

According to the present invention, this difficulty is overcome by rendering a normally hydrophilic filter film portion hydrophobic, preferably by means of a polysiloxane coating which may be applied by exposing the film to vapors of methylchlorosilane, or by treatment with a silicone. In an embodiment of the invention in a dispenser, the treated filter film is combined with a cap having a liquid outlet passage in parallel fluid-flow relation with an air inlet passage, in such a manner that the hydrophilic portion of the filter passes liquid into the outlet passage, and the hydrophobic portion passes air into the container to replace the discharged liquid. When wet, the hydrophilic portion passes no substantial flow of air, but filters any liquid returning from the outlet conduit back into the container when the dispenser is released by the user. The hydrophobic portion is not wet by the liquid, and therefore maintains its effectiveness to pass air and to filter micro-organisms therefrom.

The dispenser cap is preferably formed with interior and exterior concentric circular wall portions defining and separating a liquid outlet conduit terminating in a discharge nozzle, and a concentric annular air inlet conduit terminating in one or more air inlet ports formed in the exterior surface of the cap. The interior wall portion terminates within the cap in a circular plane surface, for sealing engagement with a first annular portion of the filter film, which lies intermediate an inner circular portion of the film comprising an hydrophilic filter in the liquid outlet passage, and an outer annular area of the film comprising an hydrophobic filter in the air inlet passage. The termination of the interior wall provides an enlarged passage in the base of the cap communicating in parallel flow relation with both conduits, and tube means are preferably mounted in the base of the cap to connect this enlarged passage with the interior of the collapsible container.

The microporous filter films contemplated by the invention are generally thin and brittle, and we therefore prefer to provide a pair of perforated support discs superimposed on opposite sides of the film. One of these discs has an unperforated annular area interposed between and sealingly engaged with the aforementioned first annular portion of the filter film and the circular plane surface in which the interior wall terminates. In this manner, the flow of liquid passed by the hydrophilic portion of the filter is prevented from entering the air inlet conduit and leaking out the air inlet ports.

In its broader aspects, the invention may be applied to a wide variety of apparatus in which it is required that flows of gas and liquid to and from a liquid chamber or container be filtered and separated. For example, the improved filter may be applied to ventilated supply tanks for fuel dispenser pumps, by interposing an hydrophobic filter portion in a vent pipe, and an hydrophilic filter portion in a fuel line extending from the tank to the pump.

It is accordingly an object of the invention to provide improved means for filtering and dividing flows of liquid and gas.

It is another object of the invention to afford an improved microporous filter, which is effective to separate flows of gas and liquid to and from a liquid chamber.

It is still another object of the invention to provide improved means for dispensing liquid from a chamber, for admitting air to the chamber to replace the released liquid, and for filtering the liquid and gas of micro-organisms and micron-sized particles.

Further objects and advantages of the invention will become apparent as the following detailed description of a preferred embodiment proceeds, referring to the accompanying drawings, in which:

FIG. 1 is a view in elevation of a dispenser according to a preferred embodiment of the invention;

FIG. 2 is a sectional view in elevation of a fragmentary portion of the dispenser; and FIG. 3 is a sectional view taken along line 3—3 in FIG. 2, looking in the direction of the arrows.

Referring to the drawings, the improved dispenser includes a collapsible container 10 of a suitable resilient plastic material, such as polyethylene. The material is selected for resistance to deterioration by the medicine or other liquid to be dispensed, as well as for resiliency. A series of threads 12 are formed at the upper end of the container for engagement with a removable cover 14 of similar material, for sealing the dispenser against evaporation and leakage of the liquid when not in use. The means thus far described in themselves form no part of the invention, which finds utility in a variety of dispensers.

The dispenser further includes a cap 16 which is received within an annular groove 18 formed about the neck of the container, and cemented or otherwise suitably secured in sealing engagement therewith. The cap 16 is formed with an interior annular wall portion 20 and an exterior concentric annular wall portion 22, which define a liquid outlet conduit 24 and an annular air inlet conduit or passageway 26. A series of air inlet ports 28 are formed about a tapered surface 30 of the cap for admission of air into the dispenser through the conduit 26. At its upper end, the liquid conduit 24 terminates in a suitable discharge nozzle 32, designed for the particular use to which the dispenser is adapted; by way of illustration, a nasal spray nozzle is shown in the drawing.

The interior wall portion 20 terminates at its lower end in a circular plane surface 34, providing an enlarged passage 36 in the base of the cap. In the preferred embodiment shown, tube means 38 having a flared-out conical portion 40 are extended partially into the enlarged passage, and the periphery 42 of the flared-out portion is cemented or otherwise sealingly secured within the exterior wall portion 22. The provision of tube means is not essential to the practice of the invention, but is desirable for improving the dispensing action. The tube means terminate in spaced relation to the bottom of the container 10.

A microporous filter film generally designated 44, which is preferably of a kind described by any of the aforementioned patents of Zsigmondy, Lovell and Bush, or Cotton, is treated in an outer annular portion 46 to form thereon a coating of a polysiloxane, for rendering this portion hydrophobic, that is, repellent to wetting by liquid. This process may be carried out by exposing the filter film to vapors of alkyl silicone halide as described by Patnode in U.S. Patent No. 2,306,222, or by any other method which will render only this portion of the film hydrophobic. A central portion 48 of the film is untreated, and maintains its normally hydrophilic character, that is, it is readily wetted by liquid. An intermediate annular portion 50 of the film, which may be defined as that portion over which the terminating plane surface 34 of the wall portion 20 is superposed, may be treated or untreated, but it is preferred that the coating extend inwardly to some intermediate radial boundary 52.

The filter films utilized in the improved dispenser are generally brittle and physically weak, and consequently a pair of perforated discs 54 and 56 are superimposed on opposite sides of the filter 44 to afford adequate support. Small perforations 57 are formed in the discs in sufficiently large numbers to permit free fluid flow through the filter film, while maintaining local support. The upper disc 54 is provided with an intermediate annular area 58 which is free of perforations, for sealing engagement between the terminating surface 34 of the wall portion 20 and the intermediate portion 50 of the filter film. The assembly is secured in place, and sealing engagement is maintained, by means of the peripheral portion 42 of the tube means 38, compressing the assembly against the surface 34. In the event that tube means are not provided, the assembly may be cemented or otherwise suitably secured within the wall portion 22, to the same end. By these means, liquid is prevented from entering the air inlet passage 26 through the hydrophilic portion 48 of the filter, and thus from leaking through the air inlet ports 28.

Prior to the use of the dispenser, when the hydrophilic portion 48 is dry, air may enter the container through the outlet passage 24. However, upon discharge of liquid through the conduit 24 in the normal use of the dispenser, the hydrophilic portion is wet and will not pass air with any substantial rate of flow. The hydrophobic portion 46, which does not pass liquid at any time and is not wet by the liquid discharge, receives air from the ports 28 and conduit 26, filters micro-organisms from the flow, and passes it into the tube 38 of the container, upon its release by the user. The influx of air permits the container to return resiliently to its original expanded form.

While a preferred embodiment of the invention has been described by way of illustration, it will be apparent to those skilled in the art that various modifications may be made without departing from the true spirit and scope of the invention. The invention is useful not only in collapsible dispensers, but also in any apparatus in which it is desired to filter and to isolate gas and liquid into parallel flows to and from a container. It is therefore intended to define the invention in the appended claims without limitation to specific details of the embodiment herein described.

What is claimed is:

1. In combination with means forming a chamber for liquid and having liquid and gas flow means communicating with said chamber in parallel fluid-flow relation, an hydrophilic filter readily wetted by the liquid and arranged in said liquid flow means and sufficiently porous to filter liquid therethrough and to block the flow of gas therethrough when wet, and an hydrophobic filter repellent to wetting by the liquid and arranged in said gas flow means and sufficiently porous to block the flow of liquid therethrough and to filter gas therethrough.

2. The combination recited in claim 1, in which said hydrophobic filter is coated with a polysiloxane.

3. The combination recited in claim 1, in which said hydrophilic and hydrophobic filters are microporous.

4. In combination with means forming a chamber for liquid and having liquid delivery conduit means and gas inlet conduit means communicating with said chamber in parallel fluid-flow relation, an hydrophilic filter readily wetted by the liquid and arranged in said liquid delivery conduit means and sufficiently porous to pass liquid therethrough and to block the flow of gas therethrough when wet, and an hydrophobic filter repellent to wetting by the liquid and arranged in said gas inlet conduit means and sufficiently porous to block the flow of liquid therethrough and to pass gas therethrough.

5. A dispenser comprising a container for a liquid, said container having liquid outlet conduit means and air inlet conduit means connected in parallel fluid-flow relation between the interior and exterior thereof, an hydrophilic microporous filter readily wetted by the liquid and arranged in said outlet conduit means to pass liquid therethrough and to block the flow of air into said container when wet, and an hydrophobic microporous filter repellent to wetting by the liquid and arranged in said inlet conduit means to block the flow of liquid therethrough and to filter micro-organisms from air passed therethrough into said container.

6. A dispenser comprising a collapsible container for a liquid, a cap for said container forming a liquid outlet conduit and an air inlet conduit connected in parallel fluid-flow relation between the interior and exterior of said container, an hydrophilic microporous filter readily wetted by the liquid and arranged in said outlet conduit to pass liquid therethrough and to block the flow of air into said container when wet, and an hydrophobic microporous filter repellent to wetting by the liquid and arranged in said inlet conduit to block the flow of liquid therethrough and to filter micro-organisms from air passed therethrough into said container.

7. For use with a collapsible container; means for releasing liquid from said container, admitting air to said container to replace released liquid, and for sealing said container against the ingress of micro-organisms; said means comprising a cap for attachment to the container, said cap forming a liquid outlet conduit and an air inlet passageway in parallel fluid-flow relation with said container, an hydrophilic microporous filter readily wetted by the liquid and arranged in said outlet conduit to pass liquid therethrough and to block the flow of air into said container when wet, and an hydrophobic microporous filter repellent to wetting by the liquid and arranged in said inlet passageway to block the flow of liquid therethrough and to pass air into said container.

8. For use with a collapsible container; means for releasing liquid from said container, admitting air to said container to replace released liquid, and sealing said container against the ingress of micro-organisms, said means comprising a cap formed with a liquid outlet conduit and with an air inlet passageway, said cap having means for communicating said inlet passageway and outlet conduit in parallel fluid-flow relation with said container, and a microporous filter film positioned in said cap for serial flow therethrough between each of said conduit, passageway, and said communicating means, one portion of said filter film receiving flow from said air inlet passageway and being hydrophobically repellent to wetting by liquid contained in said container, and a further portion of said filter film passing flow to said liquid outlet conduit and being hydrophilically readily wetted by the liquid in said container.

9. The combination recited in claim 8, in which said first portion of said filter film is coated with a polysiloxane.

10. For use with a collapsible container; means for releasing liquid from said container, admitting air to said container to replace released liquid, and sealing said container against the ingress of micro-organisms, said means comprising a cap formed centrally with a liquid outlet conduit terminating exteriorly in a nozzle and with a concentric air inlet passageway terminating exteriorly in an inlet port, said cap having means for communicating said inlet passageway and outlet conduit in parallel fluid-flow relation with said container, and a microporous filter film positioned in said cap for serial flow therethrough between each of said conduit, passageway, and said communicating means, one portion of said filter film receiving flow from said air inlet passageway and being hydrophobically repellent to wetting by liquid contained in said container, and a further portion of said filter film passing flow to said liquid outlet conduit and being hydrophilically readily wetted by the liquid contained in said container.

11. For use with a collapsible container; means for releasing liquid from said container, admitting air to said container to replace released liquid, and sealing said container against the ingress of micro-organisms, said means comprising a cap having interior and exterior wall portions defining and separating a liquid outlet conduit terminating exteriorly in a nozzle and an air inlet passageway terminating exteriorly in an inlet port, said interior wall portion terminating within said cap to form within said exterior wall portion an enlarged passage communicating with said inlet passageway and outlet conduit and arranged to connect said passageway and conduit in parallel fluid-flow relation with said container and a microporous filter film positioned in said enlarged passage, means sealingly engaging a first portion of said filter film with said interior wall portion for serial flow between said air inlet passageway and said enlarged passage only through a second portion of said filter film, and for serial flow between said liquid outlet conduit and said enlarged passage only through a third portion of said filter film, said second portion being hydrophobically repellent to wetting by liquid contained in said container, and said third portion being hydrophilically wetted by the liquid contained in said container.

12. The combination recited in claim 11, together with at least one perforated supporting element overlying said filter film.

13. The combination recited in claim 12, in which said supporting element is formed with an unperforated portion interposed between said sealingly engaging said interior wall portion and said first portion.

References Cited in the file of this patent

UNITED STATES PATENTS

| | | |
|---|---|---|
| 2,389,185 | Dick | Nov. 20, 1945 |
| 2,541,838 | Shardlow | Feb. 13, 1951 |
| 2,715,981 | Moubayed | Aug. 23, 1955 |
| 2,743,038 | Ferries | Apr. 24, 1956 |
| 2,783,894 | Lovell et al. | Mar. 5, 1957 |
| 2,812,117 | Butkus et al. | Nov. 5, 1957 |